United States Patent
Johansson (10) Patent No.: US 11,115,844 B2
(45) Date of Patent: *Sep. 7, 2021

(54) METHOD FOR MANAGING ENHANCED PHYSICAL DOWNLINK CONTROL CHANNEL, WIRELESS COMMUNICATION NETWORK, COMPUTER PROGRAMS AND COMPUTER PROGRAM PRODUCTS

(71) Applicant: TELEFONAKTIEBOLAGET LM ERICSSON (PUBL), Stockholm (SE)

(72) Inventor: Anders Johansson, Hässelby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/574,704

(22) PCT Filed: May 20, 2015

(86) PCT No.: PCT/SE2015/050578
§ 371 (c)(1),
(2) Date: Nov. 16, 2017

(87) PCT Pub. No.: WO2016/186541
PCT Pub. Date: Nov. 24, 2016

(65) Prior Publication Data
US 2018/0152857 A1    May 31, 2018

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0053* (2013.01); *H04L 5/0064* (2013.01);
(Continued)

(58) Field of Classification Search
CPC .. H04W 24/08; H04W 72/042; H04W 72/044; H04W 52/0203; H04W 72/1263;
(Continued)

(56) References Cited

U.S. PATENT DOCUMENTS 9,320,023 B2 *   4/2016   Nory ................. H04W 72/0406
2013/0039291 A1 * 2/2013  Blankenship ......... H04L 5/0055
                                                         370/329
(Continued)

FOREIGN PATENT DOCUMENTS

WO      2014032724 A1      3/2014
WO      WO-2014032724 A1 *  3/2014    ........ H04W 72/1289

OTHER PUBLICATIONS

3GPP TSG-RAN WG1 Meeting #80; R1-150429; Source: Sony; Title: MTC Operation using ePDCCH, Athens, Greece, Feb. 9-13, 2015. (Year: 2015).*
(Continued)

*Primary Examiner* — Hassan A Phillips
*Assistant Examiner* — Mohammed S Chowdhury
(74) *Attorney, Agent, or Firm* — Rothwell, Figg, Ernst & Manbeck, P.C.

(57) ABSTRACT

The application relates to a method (60) for managing enhanced physical downlink control channel, EPDCCH, resources used in a wireless communications network (1) for transmitting scheduling assignments. The method (60) comprises establishing (61) a measure on load in the wireless communications network (1), and controlling (62) assigning one or more user terminals (3) to use EPDCCH resources based on the established measure on load. A corresponding wireless communications network (1) is provided, as well as computer programs and computer program products.

16 Claims, 5 Drawing Sheets

(51) Int. Cl.
  *H04W 72/12* (2009.01)
  *H04W 52/02* (2009.01)
  *H04W 72/04* (2009.01)

(52) U.S. Cl.
  CPC ..... *H04W 52/0203* (2013.01); *H04W 72/042* (2013.01); *H04W 72/044* (2013.01); *H04W 72/1263* (2013.01); *H04L 5/0007* (2013.01); *Y02D 30/70* (2020.08)

(58) Field of Classification Search
  CPC ......... H04W 72/0446; H04W 52/0206; H04W 72/0486; H04L 5/0053; H04L 5/0064; H04L 5/0007; Y02D 30/70
  USPC .......................................................... 370/252
  See application file for complete search history.

(56) References Cited

U.S. PATENT DOCUMENTS

| | | | | |
|---|---|---|---|---|
| 2013/0114419 A1* | 5/2013 | Chen | ..................... | H04L 5/0053 370/248 |
| 2013/0114529 A1* | 5/2013 | Chen | ..................... | H04L 1/1829 370/329 |
| 2013/0250882 A1* | 9/2013 | Dinan | ............... | H04W 72/0426 370/329 |
| 2014/0092826 A1* | 4/2014 | Eriksson | ............... | H04L 5/0048 370/329 |
| 2014/0105157 A1* | 4/2014 | Yang | ..................... | H04L 5/0007 370/329 |
| 2014/0314007 A1* | 10/2014 | Chen | ....................... | H04B 7/00 370/329 |
| 2015/0078277 A1* | 3/2015 | Seo | ....................... | H04L 5/0053 370/329 |
| 2015/0223075 A1* | 8/2015 | Bashar | .................. | H04W 16/14 370/329 |
| 2016/0007324 A1* | 1/2016 | Lee | ....................... | H04L 5/0055 370/329 |
| 2016/0128011 A1* | 5/2016 | Yang | ..................... | H04W 4/70 370/329 |
| 2017/0086148 A1* | 3/2017 | Jung | .................. | H04W 52/146 |
| 2018/0014281 A1* | 1/2018 | Takeda | .................... | H04J 11/00 |
| 2018/0077692 A1* | 3/2018 | Dinan | .................. | H04L 5/0032 |

OTHER PUBLICATIONS

3GPP TSG RAN WG1 Meeting #80; R1-150528, Source: NTT Docomo, Title: EPDCCH configuration for Rel-13 low complexity MTC, Athens, Greece, Feb. 9-13, 2015 (Year: 2015).*

International Search Report and Written Opinion dated Mar. 22, 2016, in International Application No. PCT/SE2015/050578, 9 pages.

* cited by examiner

METHOD FOR MANAGING ENHANCED PHYSICAL DOWNLINK CONTROL CHANNEL, WIRELESS COMMUNICATION NETWORK, COMPUTER PROGRAMS AND COMPUTER PROGRAM PRODUCTS

CROSS REFERENCE TO RELATED APPLICATION(S)

This application is a 35 U.S.C. § 371 National Phase Entry Application from PCT/SE2015/050578, filed May 20, 2015, designating the United States, the disclosure of which is incorporated herein in its entirety by reference.

TECHNICAL FIELD

The technology disclosed herein relates generally to the field of wireless communication networks and in particular to methods, network nodes, computer programs and computer program products for managing enhanced physical downlink control channel.

BACKGROUND

Long Term Evolution (LTE) is a radio access technology standardized by $3^{rd}$ Generation Partnership Project (3GPP). Only the Packed Switched domain is supported by LTE, i.e., there is no Circuit Switched domain as in previous 3GPP systems. The standard is based on Orthogonal Frequency Division Multiplexing (OFDM) in a downlink direction (from network node to user terminal) and Single Carrier-Frequency Division Multiple access (SC-FDMA) in an uplink direction (from user terminal to network node).

The power consumption of the LTE network is a major operating cost for the operators thereof, and hence energy-efficiency is of utmost importance. A very large part of the power is consumed by power amplifiers (PAs) in a transmitter part of radio circuitry in the base stations (denoted eNodeBs) of the LTE network, and various energy-saving features have therefore been developed. There exist, for instance, various sleep mode features wherein power consumption can be reduced by turning off the PAs during low-traffic periods.

Operators' energy operating expenses (OPEX), comprising maintenance, power etc., is expected to continue to increase and the energy performance of network nodes such as eNodeBs as well as other entities of the network may be a sales advantage. Energy-efficiency is important also for other reasons, e.g. from an environmental point of view, and ways of rendering wireless communications networks as energy-efficient as possible, e.g. by further reducing energy consumption, are needed. However, it is also important to keep user satisfaction and energy-saving features should be provided without degrading performance in the network. This is therefore also an important aspect when developing energy-saving features.

SUMMARY

An objective of the present teachings is to address the above issues, and provide improvements in view of energy performance in a wireless communications network.

The objective is according to an aspect achieved by a method for managing enhanced physical downlink control channel, EPDCCH, resources used in a wireless communications network for transmitting scheduling assignments. The method comprises establishing a measure on load in the wireless communications network, and controlling assigning one or more user terminals to use EPDCCH resources based on the established measure on load.

The method enables a sleep mode functionality at low loads also when EPDCCH is enabled in a cell, while also allowing EPDCCH usage at high loads when high control capacity is desired.

The objective is according to an aspect achieved by a computer program for a network node for management of an enhanced physical downlink control channel resources used in a wireless communications network. The computer program comprises computer program code, which, when executed on at least one processor in the network node causes the network node to perform the method as above.

The objective is according to an aspect achieved by a computer program product comprising a computer program as above and a computer readable means on which the computer program is stored.

The objective is according to an aspect achieved by a wireless communications network for managing enhanced physical downlink control channel, EPDCCH, resources used in a wireless communications network for transmitting scheduling assignments. The wireless communications network is configured to establish a measure on load in the wireless communications network, and control assigning one or more user terminals to use EPDCCH resources based on the established measure on load.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide thorough understanding of the present teachings, some aspects of LTE radio access technology are initially described. Further, an energy-saving opportunity, discovered by the inventor behind the present teachings, is also described with reference to FIG. 1.

Figure 1:
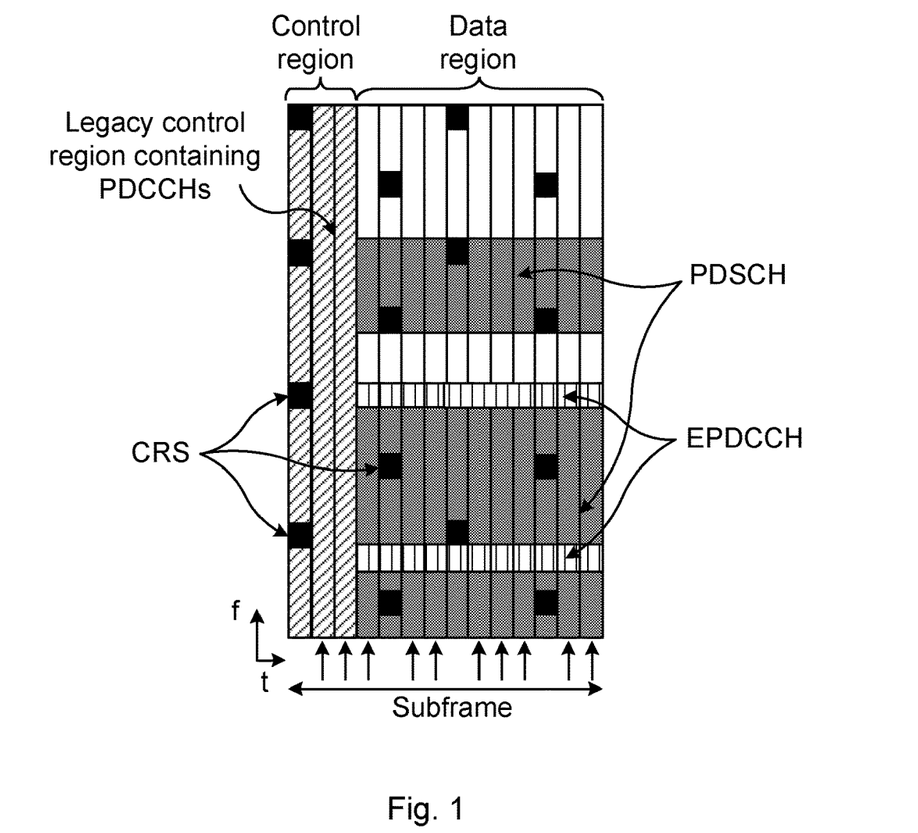
FIG. 1 illustrates schematically mapping of LTE channels in one sub-frame.

FIG. 1 illustrates schematically a sub-frame and mapping of channels in the sub-frame. In the downlink, using OFDM, the transmission is divided into sub-frames of length 1 ms. Each sub-frame is typically divided into 14 OFDM symbols in the time domain in the downlink, and one OFDM symbol then consists of a number of sub-carriers in the frequency domain. The first 1, 2, 3 or 4 OFDM symbols of the sub-frame are used to transmit the downlink control channel denoted Physical Downlink Control Channel (PDCCH) which carries information on scheduling of data in both downlink and uplink, e.g., user equipment (UE) specific scheduling assignments in downlink, resource allocation, uplink grants, etc. These OFDM symbols (3 in the example of FIG. 1) constitute a control region of the sub-frame. The remaining part of the downlink sub-frame, i.e., the remaining OFDM symbols (11 in the example of FIG. 1), is used to transmit downlink data. The sub-frame (14 OFDM symbols) is the smallest resource unit that can be allocated to the UE.

The downlink data is transmitted on a channel denoted Physical Downlink Shared Channel (PDSCH). On some of the OFDM symbols there are also cell-specific reference symbols (CRS) present. In the example of FIG. 1, 16 such CRSs are illustrated.

In LTE Release 11 (Rel-11) a new downlink control channel, denoted Enhanced PDCCH (EPDCCH), was added to the standard. This channel may be used to transmit UE-specific scheduling assignments for those UEs that are EPDCCH capable. The EPDCCH channel is multiplexed with the PDSCH covering all the OFDM symbols in the sub-frame except for the control region used by PDCCH, as illustrated in FIG. 1. The EPDCCH resources are thus multiplexed with data in one or more OFDM symbols.

There are several use cases for EPDCCH such as providing increased control channel capacity, control channel inter-cell interference cancellation (ICIC) support for Heterogeneous Networks (HetNets) and Combined Cell, and control channel beamforming. The increased control channel capacity is of particular interest since the legacy PDCCH capacity is a bottleneck in many scenarios, e.g. for applications such as Voice over LTE (VoLTE) which comprise many small packages to be sent and hence scheduled, requiring large parts of the PDCCH capacity.

An EPDCCH capable UE can be configured to monitor EPDCCH for UE specific scheduling assignments in all sub-frames or only in some of the sub-frames. The UEs are then semi-statically assigned EPDCCH resources using radio resource control (RRC) signaling. Similar to PDCCH there are also typically multiple EPDCCHs in each sub-frame and the UEs will be required to monitor the EPDCCHs to be able to detect the UE-specific assignments directed to them and in that way being able to "find" the data directed to them. The UE-specific assignments may be seen as "pointers" to a particular set of resource elements where the data is actually sent. In the sub-frames where the UE is monitoring EPDCCH for UE specific assignment the legacy PDCCH is only monitored for common DL scheduling assignments such as e.g. system information blocks (SIBs), paging and Random Access (RA) response messages (also denoted RA message 2).

A difference between EPDCCH and PDCCH is that EPDCCH is only used for UE-specific assignments and is multiplexed with PDSCH, while PDCCH can be used for both UE-specific and common assignments and is located in the control region in the beginning of each sub-frame. Additionally, the EPDCCH is more flexible than the PDCCH allowing for e.g. dynamic capacity, beamforming and ICIC, which is not possible for PDCCH. For instance, since the EPDCCH is multiplexed with the PDSCH in the data region, and is UE specific, beamforming may be applied for the EPDCCH.

As mentioned earlier, the energy efficiency of the LTE eNodeBs is important and a large part of the power is consumed by power amplifiers in a transmitter part of radio circuitry in the eNodeB. In this regards, a feature, here denoted "Micro Sleep Tx", enables reduction of energy consumption in the PA. The Micro Sleep Tx feature may shut down e.g. the power amplifier (PA) during OFDM symbols that carry no data. Some of the LTE downlink signal/channels are mandatory and will always be present and will hence also inhibit the use of the Micro Sleep Tx feature. These channels/signals comprise CRS, physical control format indicator channel (PCFICH), physical broadcast channel (PBCH), primary synchronization signal (PSS) and secondary synchronization signal (SSS). PBCH, PSS and SSS are each only present in one sub-frame out of 10, and are furthermore only transmitted in 2 or 4 OFDM symbols, for PSS/SSS and PBCH respectively, in those sub-frames. PCFICH is always present in one OFDM symbol in each sub-frame and CRS is present in 4 OFDM symbols in each sub-frame (2Tx port case, "Tx" being abbreviation for transmission). One of the OFDM symbols carrying CRS overlaps with the OFDM symbol carrying PCFICH.

The inventor has realized that there is a possibility to improve energy-efficiency of the eNodeBs. In particular, there is a potential to apply the feature Micro Sleep Tx in 8 to 10 out of 14 OFDM symbols in most of the sub-frames, as illustrated in FIG. 1 by the arrows in the lower-most part of the figure. Two of these arrows are pointing at OFDM symbols in the control region and 8 are pointing at OFDM symbols in the data region. The main part of these 8 to 10 symbols is in the region shared by PDSCH and EPDCCH (i.e. the data region).

The Micro Sleep Tx feature, i.e. the shutting down e.g. the PA during OFDM symbols that carry no data, may be used when there is no or possibly little traffic scheduled in the downlink. Hence, the Micro Sleep Tx feature may be activated when no data is transmitted on the OFDM symbols. Micro Sleep Tx is therefore mainly a low load feature. Such low load situation is however a traffic scenario of high interest, since the average amount of traffic in the eNodeB is low although the traffic variations are large.

Figure 2:
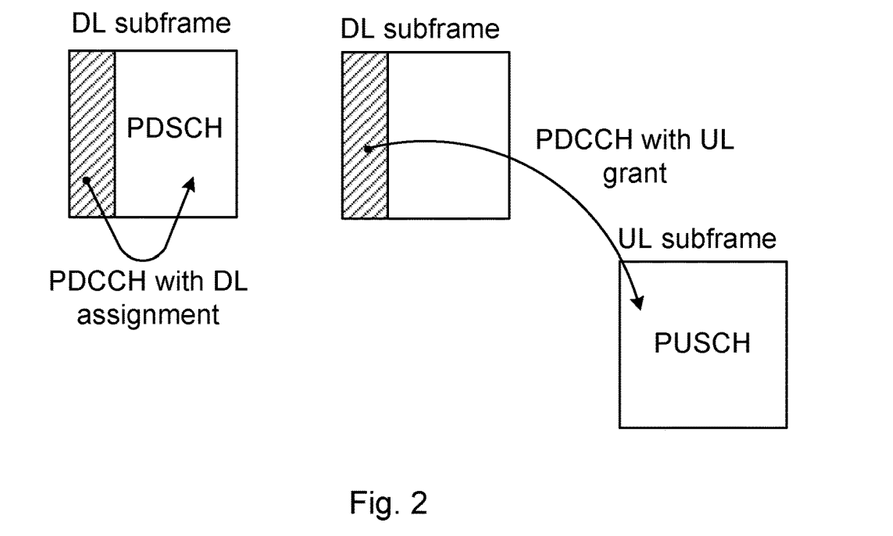
FIG. 2 illustrates use of PDCCH for downlink assignments and uplink grants.

FIG. 2 illustrates the use of PDCCH for downlink assignments and uplink grants. When PDCCH is used for scheduling downlink assignments there is no benefit for the Micro Sleep Tx feature since PDSCH will allocate data in all OFDM symbols in the data part (data region) of the sub-frame. This is illustrated at the left-hand side of FIG. 2: the PDCCH with downlink assignment (left-hand part of the downlink sub-frame) points at resources in the data region (right-hand part of the downlink sub-frame). When PDCCH is used to schedule uplink grants, however, the data region of the sub-frame is not assigned and Micro Sleep Tx feature can reduce e.g. the PA power in the radio. This is illustrated at the right hand side of FIG. 2: in a first downlink sub-frame, a PDCCH with the uplink grant points at resources in a second uplink sub-frame later in time.

Figure 3:
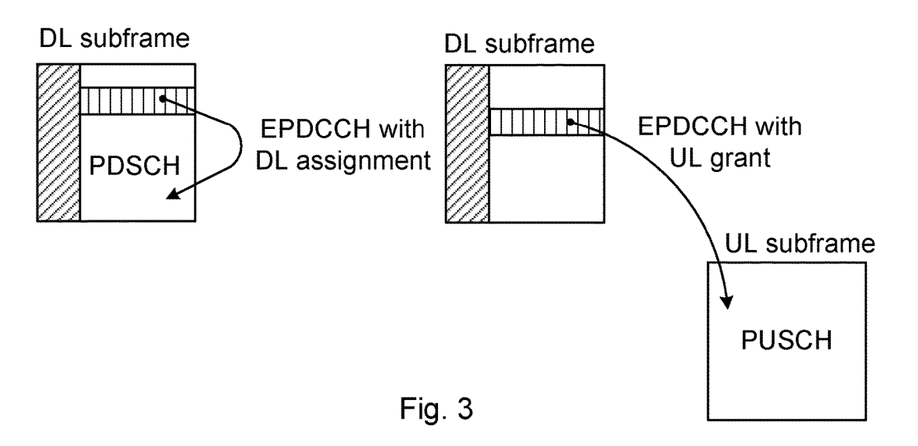
FIG. 3 illustrates use of EPDCCH for downlink assignments and uplink grants.

FIG. 3 illustrates the use of EPDCCH for downlink assignments and uplink grants. When an EPDCCH is used instead of the PDCCH to schedule a UE, the PDSCH will still block activation of the Micro Sleep Tx feature when downlink assignments are transmitted. This is illustrated at the left-hand side of FIG. 3: the EPDCCH with downlink assignment points at PDSCH in the same sub-frame. Likewise, for uplink grants the use of the Micro Sleep Tx feature will be blocked due to the mapping of EPDCCH in the data region of the downlink sub-frame. This is illustrated at the right-hand side of FIG. 3: the EPDCCH with uplink grant blocks the use of the Micro Sleep Tx feature in a first downlink sub-frame, and the physical uplink shared channel (PUSCH) in a sub-frame later in time is also occupied.

Hence EPDCCH prevents the Micro Sleep Tx feature also when only UL grants are scheduled in a sub-frame, which is not the case when PDCCH is used. This will impact the possible eNodeB power savings with Micro Sleep Tx when EPDCCH is introduced. It is important to ensure a high eNodeB energy performance when the control channel EPDCCH is introduced. Accordingly, the present teachings provide, in different embodiments, methods for achieving this. In various embodiments thus, a solution is to assign EPDCCH resources to EPDCCH capable UEs in dependence on load situation, e.g. assigning EPDCCH resources only at medium and high load. This enables an energy saving to be made without impacting the service level to the user to any larger extent. A well-balanced tradeoff between energy-efficiency and high user satisfaction is thereby achieved.

In various embodiments, only PDCCH is used at low load in order to enable the Micro Sleep Tx feature for UL grants, but at high load, e.g. when cell load exceeds a threshold, EPDCCH resources may be assigned to new UEs entering the cell. The UEs that are already connected and uses PDCCH may, optionally, also be assigned EPDCCH resources. In correspondence with the case of high load, when the load decreases, e.g. falls below a threshold, new UEs entering the cell are not assigned EPDCCH resources and will therefore be using PDCCH by default. Optionally, EPDCCH resources may be removed from UEs already present in the cell and assigned with such EPDCCH resources.

Various embodiments of the method may be implemented by utilizing information already available in the eNodeB.

Figure 4:
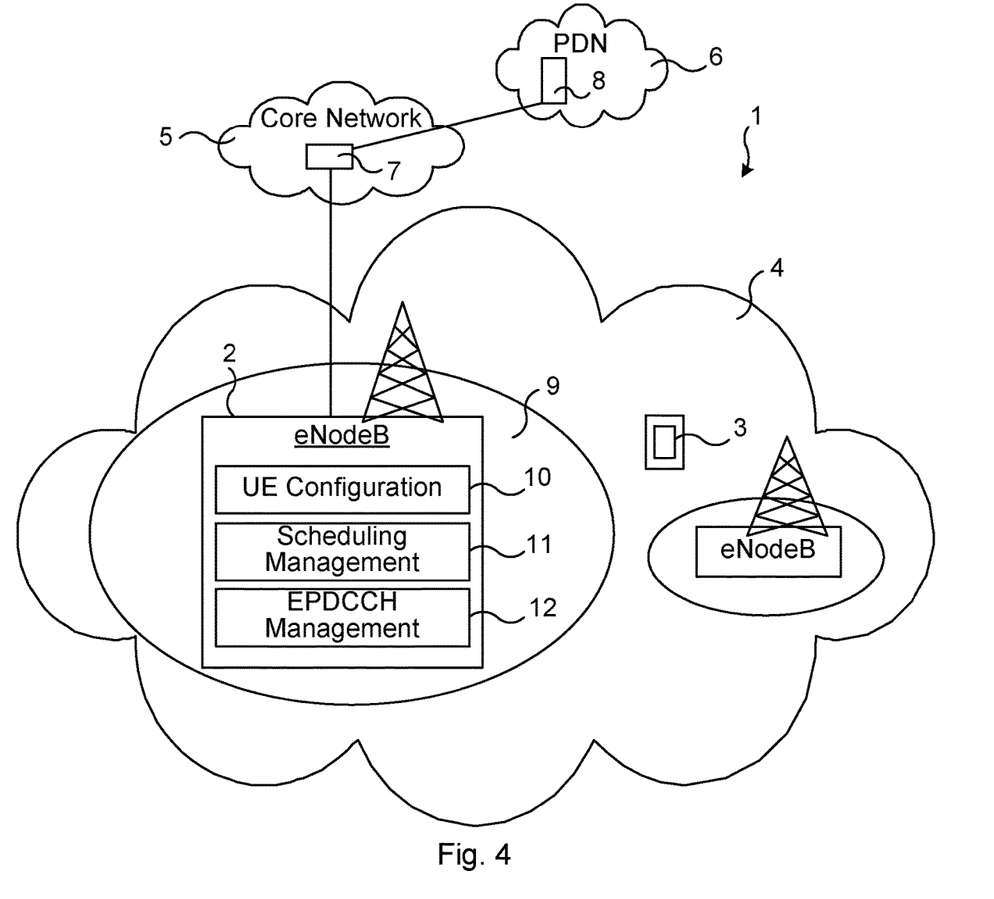
FIG. 4 illustrates an environment in which embodiments of the present teachings may be implemented.

FIG. 4 illustrates an environment in which embodiments of the present teachings may be implemented. The wireless communications network 1 comprises a radio access network 4, illustrated in the figure as implementing Evolved Universal Terrestrial Radio Access Network (E-UTRAN). The radio access network 4 comprises a number of radio access nodes 2, which are interconnected with each other, and able to exchange communication e.g. over an X2 interface.

The radio access nodes 2 provide wireless communication to a number of user terminals 3, each radio access node 2 providing communication coverage in one or more geographical areas (typically denoted cells). In the FIG. 4, two such cells are indicated: a first cell C1 controlled by a first radio access node 2, and a second cell C2 controlled by a second radio access node. It is noted that the radio access nodes may control several cells. In the following the radio access node 2 is exemplified by eNodeB.

The user terminal 3 may comprise any type of device able to communicate wirelessly with the eNodeB 2, examples of which comprise smart phones, laptops, tablet computers etc. The user terminal 3 is also denoted user equipment (UE) in the present disclosure.

The wireless communications network 1 may comprise a core network 5 comprising nodes such as Mobility Management Entity (MME), serving gateway, etc., such nodes indicated collectively at reference numeral 7. The wireless communications network 1 may comprise a data network gateway (PDN-GW) providing connectivity to an external packet data network 6, e.g. a cluster of servers, which is sometimes referred to as a "cloud". One server of such cluster of servers (such as the Internet) is indicated at reference numeral 8.

FIG. 4 also indicates logical parts of the eNodeB 2 that may be used according to various embodiments according to the present teachings. In particular, the eNodeB 2 may comprise a UE configuration entity 10, a scheduling management entity 11 and an EPDCCH management entity 12 are illustrated.

Information required to implement embodiments of the present teachings, in particular enabling use of the Micro sleep Tx feature even when EPDCCH is used, may be available in the eNodeB 2. In the following, and in various embodiments, guidance for how such different pieces of information may be combined to achieve the desired system behavior is provided.

The UE configuration entity 10 comprises information on whether or not a UE 3, for which the eNodeB 2 is the serving node, is EPDCCH capable or not. The UE configuration entity 10 also comprises information on EPDCCH assignments; e.g. in case the UE 3 is EPDCCH capable, the UE configuration entity 10 knows if the UE 3 has been assigned EPDCCH resources.

The Scheduling Management entity 11 comprises information on if the UE is monitoring EPDCCH or PDCCH in the next TTI. The Scheduling Management entity 11 also comprises information regarding a "Cell EPDCCH state" in a cell. The "Cell EPDCCH state" is a new state introduced by the present teachings, which may be used for keeping track of the usage of EPDCCH. The "Cell EPDCCH state" is either disabled, i.e. no or few EPDCCH resources shall be used by UEs in the cell, or it is enabled, i.e. EPDCCH is allowed to be assigned to UEs in the cell (without restrictions).

The EPDCCH Management entity 12 comprises a functionality to assign or remove EPDCCH resources of UEs 3.

It is noted that although the entities and their functionalities are described as included in the eNodeB 2, they may, in other embodiments, be distributed within the wireless communications network 1 or even in an external packet data network 5.

Figure 5:
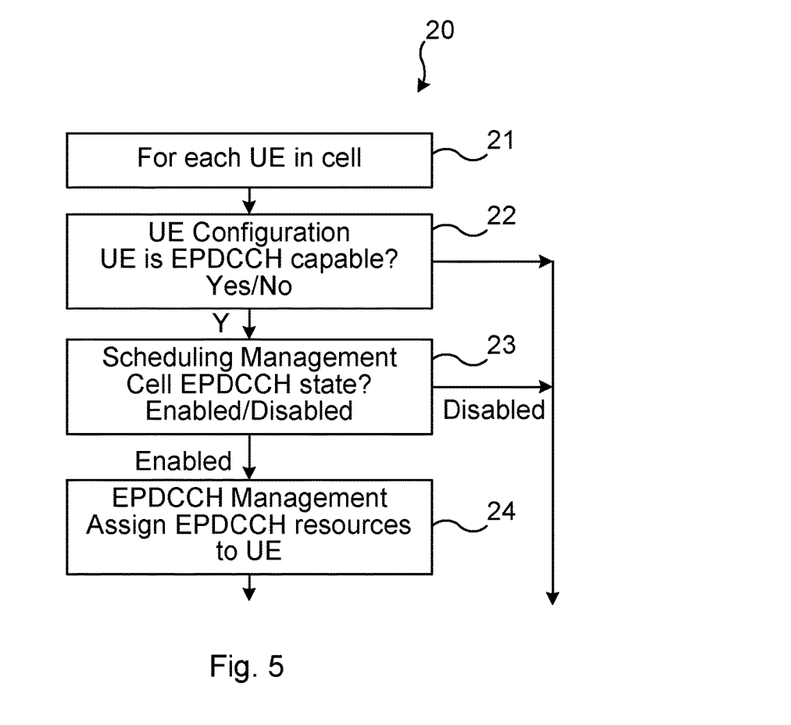
FIG. 5 is a flow chart over steps of a method in accordance with the present teachings.

FIG. 5 outlines an interaction that may be implemented between the different logical parts, i.e. the UE configuration entity 10, the Scheduling Management entity 11 and the EPDCCH Management entity 12. As shown in FIG. 5, for every new UE 3 (box 21) connected to the cell it may be determined if the UE 3 shall be assigned EPDCCH resources or not. In box 22, if the UE is not EPDCCH capable, then flow ends. If in box 22, it is determined (by use of information in the UE configuration entity 10) that the UE is EPDCCH capable, flow continues to box 23.

In box 23, it is determined (by using information in the Scheduling management entity 23) if the cell, serving the UE, is in an EPDCCH state or not. This knowledge about if the "Cell EPDCCH state" is set to enabled or disabled is a new functionality in the Scheduling Management entity 11, compared to legacy systems. The setting of the "Cell EPDCCH state" is done by the Scheduling Management entity 11 depending on a measurement of the cell load, illustrated and described more in detail with reference to FIG. 6.

If in box 23, it is determined that the cell EPDCCH state is disabled, flow ends. If in box 23, it is determined that the cell EPDCCH state is enabled, flow continues to box 24. In box 24 it is determined that EPDCCH resources should be assigned to the UE.

The information is available in Scheduling Management entity 11, and also in legacy systems (besides the EPDCCH state), and may be used when implementing the logics of the present teachings.

Figure 6:
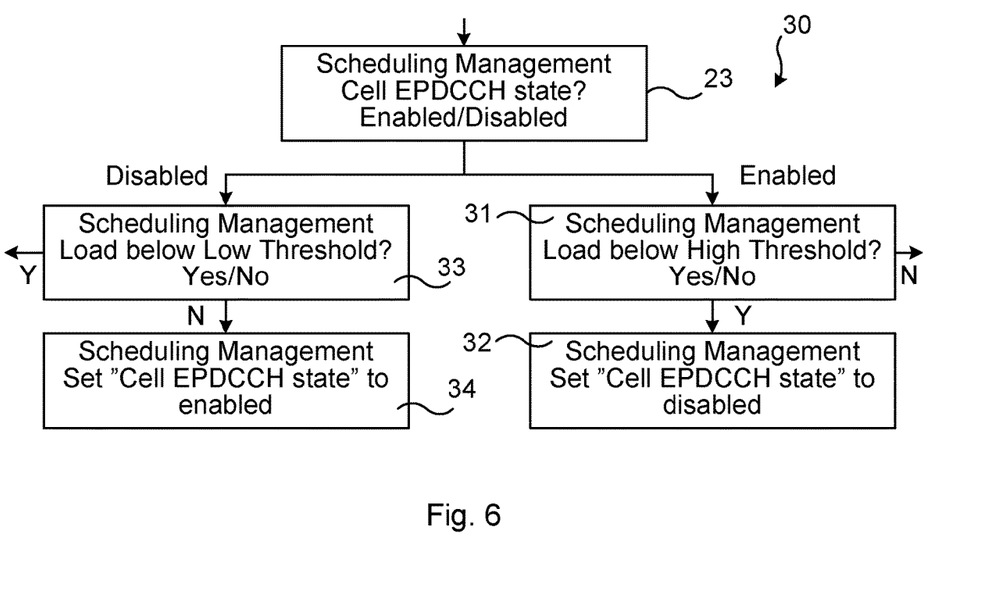
FIG. 6 is a flow chart over steps of a method in accordance with the present teachings.

Turning now to FIG. 6, the starting box 23 for the flow is a detailed flow over the decision to enable/disable the "Cell EPDCCH state". The decision to enable/disable the "Cell EPDCCH state" may be taken at every transmission time interval (TTI), or be triggered by an event like e.g. a scheduling of and PDCCH or EPDCCH, or the arrival of a new load measurement.

The load measurement can be any relevant measurement reflecting the cell load, e.g. utilization of downlink physical resource blocks (PRBs), average number of scheduling entities (SEs) or TTIs, or peak number of uplink grants per frame.

If, in box 23, the current state is "enabled" flow continues to box 31, wherein it is determined whether load is below a threshold denoted "High threshold" in the figure. If yes, the current state should be switched to disabled (box 32). In no, i.e. the load is instead above the "High threshold", then the enabled-state should be kept.

If, in box 23, the current state is "disabled" flow continues to box 33, wherein it is determined whether load is below a threshold denoted "Low threshold" in the figure. If no, the current state should be switched to enabled (box 34). In yes, i.e. the load is below the "Low threshold", then the disabled-state should be kept.

In this context it is noted that thresholds as well as measures on load may be defined in different ways, and that FIG. 6 merely provides examples on the principles of the present teachings. The thresholds could be set in an inverse manner instead, with the same intention of establishing whether or not to use EPDCCH resources in view of load situation.

Figure 7:
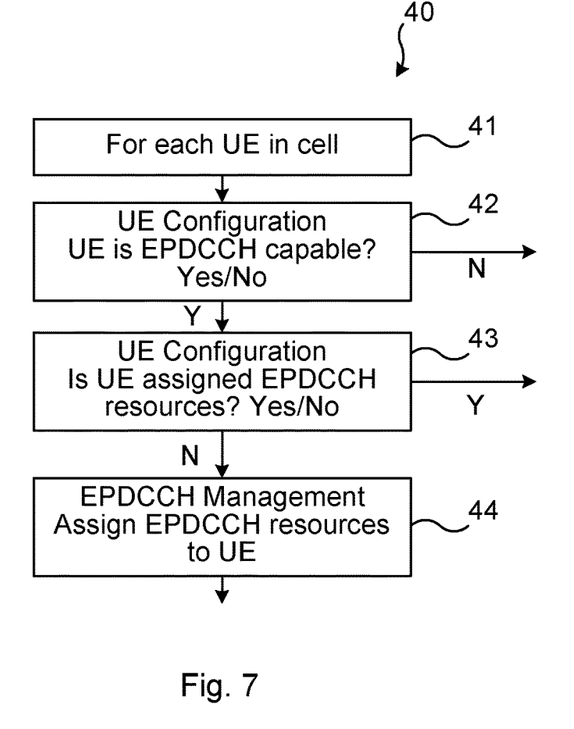
FIG. 7 is a flow chart over steps of a method in accordance with the present teachings.

When the "Cell EPDCCH state" is switched from disabled to enabled, the new UEs entering the cell may be assigned EPDCCH resources if they are EPDCCH capable, but there could still be EPDCCH capable UEs already connected in the cell that have not been assigned EPDCCH resources. These UEs may either be left as they are, i.e. without EPDCCH resources, or be assigned EPDCCH resources. The latter case is shown in FIG. 7.

In box 41, it is illustrated that the flow may be applied for each UE in the cell, for which EPDCCH resources should now be assigned.

In box 42, it is first determined if the UE is EPDCCH capable or not. As mentioned earlier, this information is available in the UE configuration entity 10. If the UE is not EPDCCH capable, the flow ends. If the UE is determined to be EPDCCH capable, then flow continues to box 43.

In box 43 it is determined if the UE is already assigned EPDCCH resources. This information is also available in the UE configuration entity 10. If the UE is already assigned EPDCCH resources, then flow ends. If the UE should be assigned EPDCCH resources, then flow continues to box 44.

In box 44, the UE is thus assigned EPDCCH resources.

Figure 8:
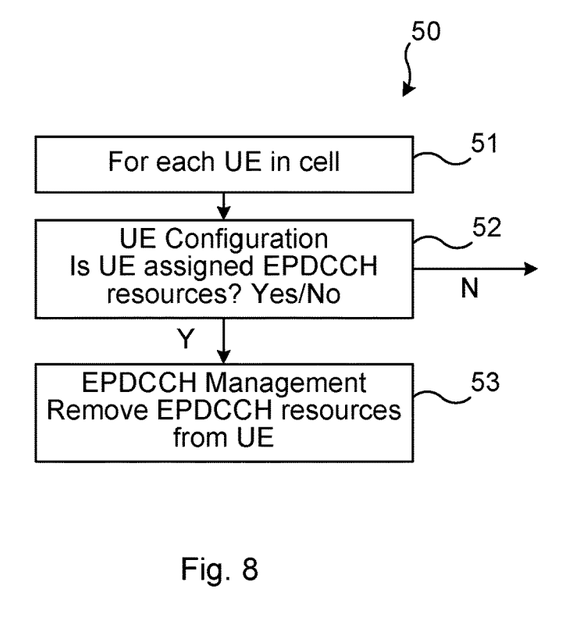
FIG. 8 is a flow chart over steps of a method in accordance with the present teachings.

Similar when the "Cell EPDCCH state" is switched from enabled to disabled, the new UEs entering the cell will not be assigned EPDCCH resources if they are EPDCCH capable, but there could still be EPDCCH capable UEs in the cell, that already have been assigned EPDCCH resources. These UEs could either be left as they are, i.e. with EPDCCH resources assigned, or be removed their EPDCCH resources. The latter case is shown in FIG. 8.

In box 51, it is illustrated that the flow may be applied for each UE in the cell, for which EPDCCH resources should now be removed.

In box 52, it is determined if the UE has been assigned to use EPDCCH resources or not. This information is also available in the UE configuration entity 10. If the UE has not been assigned to use EPDCCH resources, then flow ends. If the UE is assigned EPDCCH resources, then flow continues to box 53.

In box 53, the EPDCCH resources assigned to the UE are removed. This results in that no EPDCCH resources are assigned in the cell, and a maximized power saving can be obtained.

A core essence of the present teachings is to assign EPDCCH resources to UEs based on the cell load in order to enable the Micro Sleep Tx functionality. At low loads no EPDCCH resources are used hence enabling Micro Sleep Tx to reduce e.g. PA power consumption. At medium and high loads EPDCCH resources can be used, enabling higher control channel capacity.

The various embodiments and features that have been described may be combined in different ways, examples of which are given in the following, with reference first to FIG. 9.

Figure 9:
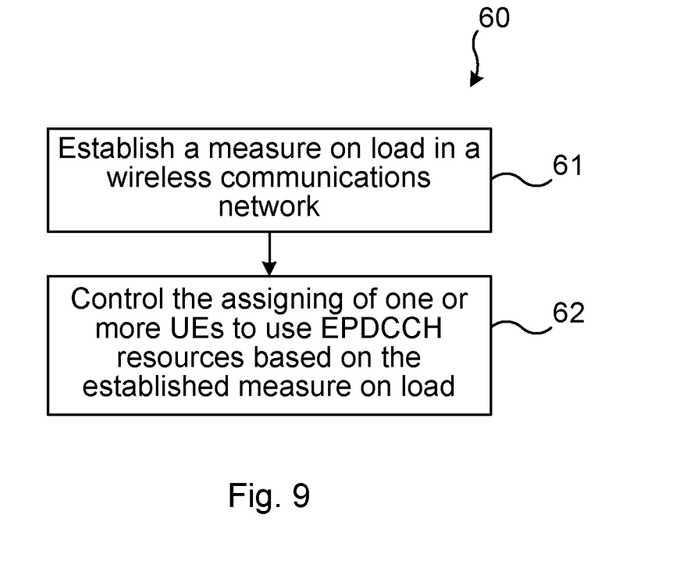
FIG. 9 is a flow chart over steps of a method in accordance with the present teachings.

FIG. 9 is a flow chart over steps of a method in accordance with the present teachings.

A method for managing enhanced physical downlink control channel, EPDCCH, resources used in a wireless communications network 1 for transmitting scheduling assignments. The EPDCCH resources may be multiplexed with data in one or more OFDM symbols. The term "enhanced physical downlink control channel" is a term used in LTE and refers, as described earlier, to a new physical downlink control channel used in LTE, wherein the physical downlink control channel resources are multiplexed with data, i.e. sent in the data region of a sub-frame. The wireless communications network 1 may thus implement LTE technology, i.e. comprise an LTE network.

The method 60 comprises establishing 61 a measure on load in the wireless communications network 1. The measure on load may for instance comprise utilization of downlink physical resource blocks or average number of scheduling entities per transmission time interval. The establishing 61 may thus comprise determining the load by retrieving one or the examples on load measure, or by receiving the load measure from another network node. In other embodiments, the establishing 61 may comprise calculating the load (e.g. based on retrieved or received values) and thereby obtaining the measure on load.

The method 60 comprises controlling 62 assigning one or more user terminals 3 to use EPDCCH resources based on the established measure on load. The assigning of EPDCCH resources to one or more user terminals 3 may be controlled based on the load, whereby a power reduction can be obtained e.g. by turning off power amplifiers when the load is low.

In an embodiment, the controlling 62 comprises assigning EPDCCH resources in a cell 9, in which the EPDCCH resources are to be used, if the established measure on load is above a first threshold value. The user terminals 3 are assigned to use the EPDCCH resources when it is justified, in particular when the load is high. It is noted that depending on how the load and thresholds are defined, the control could comprise assigning of EPDCCH resources when the measure on load is instead below a first threshold value. It is thus noted that "load above a first threshold" may equivalently be expressed by as an inverse as "load below a first threshold", the present teachings thus encompassing both equivalents.

In an embodiment, the controlling 62 comprises ceasing to assign EPDCCH resources in a cell 9, in which the EPDCCH resources are to be used, if the established measure on load is below a second threshold value.

From the above two embodiments, it is clear that the benefits of EPDCCH, e.g. increased control channel capacity, are ensured, while still enabling a power reduction to be accomplished. When the load is high and e.g. more control resources are needed, the EPDCCH resources are indeed used, but when the load is low they are not used (in some embodiments even if a few user terminals 3 are assigned to use them) and a power saving may be accomplished by turning off power amplifiers in the wireless communications network 1.

In a variation of the above embodiment, the method 60 comprises removing EPDCCH resources from one or more user terminals 3 already having EPDCCH resources assigned. There is a tradeoff between providing improved service to a few user terminals 3 and the power consumption of e.g. a network node, i.e. high service quality may be provided to these few user terminals at the cost of high power consumption. In view of this, it may be established that it is more beneficial to remove EPDCCH resources from user terminals in order to thereby be able to reduce power consumption, even if the removal may result in reduced service quality for the (few) user terminals.

In another variation, the method 60 comprises removing EPDCCH resources from all user terminals 3. In some embodiments, the user terminal that is configured for using EPDCCH resources may be reconfigured to use only legacy PDCCH resources.

In an embodiment, the method 60 comprises establishing that no EPDCCH resources or other resources are assigned in one or more orthogonal frequency division multiplexing, OFDM, symbols and entering a low power mode during the OFDM symbols. The low power mode may for instance comprise turning off power amplifiers used in e.g. a network node of the wireless communications network 1.

In an embodiment, the method 60 comprises, after the establishing 61, setting a state in a cell 9 of the wireless communications network 1 to EPDCCH enabled or EPDCCH disabled based on the established measure on load, and wherein the controlling 62 comprises enabling or disabling assigning user terminals to use EPDCCH resources according to the set state.

In various embodiments, the establishing 61 the measure on the load comprises establishing, for a cell 9 of the wireless communications network 1 in which the EPDCCH resources are to be used, utilization of downlink physical resource blocks, average number of scheduling entities per transmission time interval, utilization of control channel elements of a physical downlink control channel or peak number of uplink grants per frame.

In an embodiment, the method 60 is implemented for and performed in a single network node 2. In other embodiments, the method 60 may be performed in a distributed fashion, wherein different functions/steps are performed by different devices or network nodes. For instance, the establishing the load may be performed in a first node of the wireless communications network or elsewhere, e.g. in a core network node or a server of an external packet data network, while the controlling the assigning one or more user terminals to use EPDCCH resources is performed e.g. in a base station of the wireless communications network 1.

The method 60 may be implemented in a network node 2 such as an eNB, and the establishing the load may comprise establishing degree of resource utilization e.g. utilization of downlink resources, uplink resources, total amount of resources etc., or anything giving a measure on the load of the eNB, or load of a scheduler thereof or the like.

Figure 10:
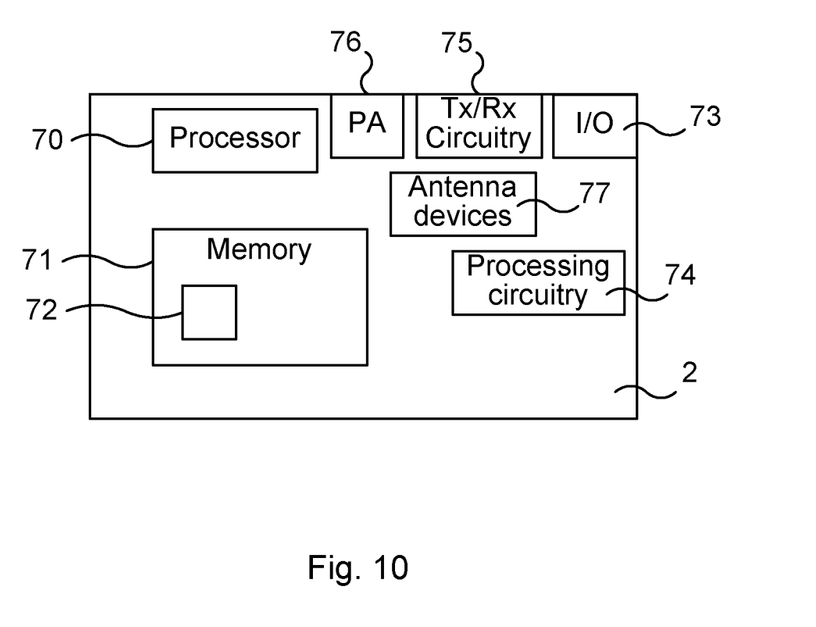
FIG. 10 illustrates schematically a network node of a wireless communications network and means for implementing embodiments according to the present teachings.

FIG. 10 illustrates schematically a network node of a wireless communications system and means for implementing embodiments of the present teachings. As mentioned above, the method 60 may be implemented in a distributed fashion, but in the following an example of a single network node being configured to perform the method 60 is described.

The network node 2, e.g. an eNodeB, comprises a processor 70 comprising any combination of one or more of a central processing unit (CPU), multiprocessor, microcontroller, digital signal processor (DSP), application specific integrated circuit etc. capable of executing software instructions stored in a memory 71, which can thus be a computer program product 71. The processor 70 can be configured to execute any of the various embodiments of the method as have been described, for instance as described in relation to FIG. 9.

The memory 71 can be any combination of read and write memory (RAM) and read only memory (ROM), Flash memory, magnetic tape, Compact Disc (CD)-ROM, digital versatile disc (DVD), Blu-ray disc etc. The memory 71 also comprises persistent storage, which, for example, can be any single one or combination of magnetic memory, optical memory, solid state memory or even remotely mounted memory.

The network node 2 may also comprise an input/output device 73, indicated by I/O in FIG. 10. The input/output device 73 may comprise an interface for communication exchange for instance with other network nodes or other entities of the wireless communications network 1.

The network node 2 may also comprise or be configured to control antenna devices 77 for communicating wirelessly with wireless devices residing within its coverage area(s), in particular by transmitting and/or receiving signaling to/from the wireless user terminals within its coverage area(s). For this end, the network node 2 may also comprise processing circuitry for processing signaling received wirelessly from the user terminals 3 and also processing circuitry for processing signaling to be transmitted wirelessly to the user terminals 3. Such circuitry is illustrated in the figure at reference numeral 75 and indicated by "Tx/Rx circuitry". Still other processing circuitry, indicated at reference numeral 74, may be provided for implementing the various embodiments described, e.g. processing circuitry adapted for performing the steps of the method.

The network node 2 may comprise still other components, e.g. power amplifiers 76 (indicated in the figure as PA), conventionally used in such a network node.

A wireless communications network 1 for managing enhanced physical downlink control channel, EPDCCH, resources is provided. The EPDCCH resources are used in the wireless communications network 1 for transmitting scheduling assignments. The wireless communications network 1 is configured to:

establish a measure on load in the wireless communications network 1, and control assigning one or more user terminals 3 to use EPDCCH resources based on the established measure on load.

The wireless communications network 1, e.g. a network node 2 thereof, may be configured to perform the above steps e.g. by comprising a processor 70 and memory 71, the memory 71 containing instructions executable by the processor 70, whereby the wireless communications network 1 (or network node 2 thereof) is operative to perform the steps.

In an embodiment, the wireless communications network 1 is configured to control by assigning EPDCCH resources in a cell 9, in which the EPDCCH resources are to be used, if the established measure on load is above a first threshold value.

In an embodiment, the wireless communications network 1 is configured to control by ceasing to assign EPDCCH resources in a cell 9, in which the EPDCCH resources are to be used, if the established measure on load is below a second threshold value.

In an embodiment, the wireless communications network 1 is configured to remove EPDCCH resources from one or more user terminals 3 already having EPDCCH resources assigned.

In a variation of the above embodiment, the wireless communications network 1 is configured to remove EPDCCH resources from all user terminals 3.

In an embodiment, the wireless communications network 1 is configured to establish that no EPDCCH resources or other resources are assigned in one or more orthogonal frequency division multiplexing, OFDM, symbols and entering a low power mode during the OFDM symbols.

In an embodiment, the wireless communications network 1 is configured to, after the establishing, set a state in a cell 9 of the wireless communications network 1 to EPDCCH enabled or EPDCCH disabled based on the established measure on load, and configured to control by enabling or disabling assigning of EPDCCH resources according to the set state.

In an embodiment, the wireless communications network 1 is configured to establish the measure on the load by establishing, for a cell 9 of the wireless communications network 1 in which the EPDCCH resources are to be used, utilization of downlink physical resource blocks, average number of scheduling entities per transmission time interval, utilization of control channel elements of a physical downlink control channel or peak number of uplink grants per frame.

In various embodiments, the wireless communications network 1 comprises a network node 2 configured to establish a measure on load in the wireless communications network 1, and to control assigning one or more user terminals 3 to use EPDCCH resources based on the established measure on load. That is, the steps of the various embodiments are performed in a single network node 2, which is thus configured to perform all steps of the respective embodiments.

The present disclosure also encompasses one or more computer program products, schematically illustrated at reference numeral 71, comprising one or more computer programs 72 for a communication system 1 and a computer readable means on which the computer program(s) 72 is (/are) stored. Each computer program 72 comprises computer program code, which, when executed on at least one processor in the wireless communications network 1 causes the wireless communications network 1 to perform the method 60 according to any of the described embodiments thereof. Depending on whether the teachings are implemented in a single node or in a distributed fashion, one or more such computer programs and computer program products are needed.

The computer program products 72, or the memories, thus comprise instructions executable by a processor 70. Such instructions may be comprised in a computer program, or in one or more software modules or function modules.

Means are provided, e.g. function modules, that can be implemented using software instructions such as computer program executing in a processor and/or using hardware, such as application specific integrated circuits, field programmable gate arrays, discrete logical components etc., or any combination thereof.

In particular, a wireless communications network is provided for managing enhanced physical downlink control channel, EPDCCH, resources used in the wireless communications network for transmitting scheduling assignments. The wireless communications network comprises first means for establishing a measure on load in the wireless communications network. Such first means may comprise processing circuitry (e.g. processing circuitry 74 indicated in FIG. 10) adapted to establish a measure.

The wireless communications network comprises second means for controlling assigning one or more user terminals to use EPDCCH resources based on the established measure on load. Such second means may comprise processing circuitry (e.g. processing circuitry 74 indicated in FIG. 10) adapted to perform such control.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for managing enhanced physical downlink control channel, EPDCCH, resources used in a wireless communications network for transmitting scheduling assignments, the method comprising:
    establishing a measure on load in a cell of the wireless communications network;
    controlling a use of EPDCCH resources based on the established measure on load, wherein the controlling the use of EPDCCH resources comprises not using any EPDCCH resource to transmit control information to an EPDCCH capable user terminal while the measure on load is below a first threshold;
    detecting that no EPDCCH resources or other resources are assigned in a set of one or more orthogonal frequency division multiplexing (OFDM) symbols; and
    in response to detecting that no EPDCCH resources or other resources are assigned in the set of one or more OFDM symbols, causing one or more power amplifiers of a base station to enter a low power or no power mode during the set of one or more OFDM symbols.

2. The method as claimed in claim 1, further comprising:
    determining that the measure on load is above the first threshold, wherein
    the controlling further comprises assigning EPDCCH resources in the cell as a result of determining that the established measure on load is above the first threshold.

3. The method as claimed in claim 1, further comprising:
    determining that the measure on load is above the first threshold, wherein
    the controlling further comprises ceasing to assign EPDCCH resources in the cell as a result of determining that the established measure on load is below the first threshold.

4. The method as claimed in claim 1, further comprising:
    assigning EPDCCH resources to a user equipment (UE);

after assigning the EPDCH resources to the UE, determining that the measure on load is below the first threshold; and in response to determining that the measure on load is below the first threshold, removing from the UE said EPDCCH resources that were assigned to the UE.

5. The method as claimed in claim 1, further comprising setting a state in a cell of the wireless communications network to EPDCCH disabled based on the established measure on load, wherein the step of controlling the use of EPDCCH resources based on the established measure on load comprises determining that the state in the cell is set to EPDCCH disabled and not assigning EPDCCH resources as a result of determining that the state in the cell is set to EPDCCH disabled.

6. The method as claimed in claim 1, wherein the establishing the measure on the load comprises establishing, for the cell of the wireless communications network, utilization of downlink physical resource blocks, average number of scheduling entities per transmission time interval, utilization of control channel elements of a physical downlink control channel, or peak number of uplink grants per frame.

7. The method as claimed in claim 1, wherein the method is performed in a network node.

8. A computer program product comprising a non-transitory computer readable medium storing a computer program for a network node for management of an enhanced physical downlink control channel, EPDCCH, resources used in a wireless communications network, the computer program comprising computer program code, which, when executed on at least one processor in the network node causes the network node to perform the method according to claim 1.

9. A wireless communications network node for managing enhanced physical downlink control channel (EPDCCH) resources used in a wireless communications network for transmitting scheduling assignments, the wireless communications network node comprising:

a memory; and processing circuitry coupled to the memory, wherein the wireless communications network node is configured to:

establish a measure on load in a cell of the wireless communications network, control a use of EPDCCH resources based on the established measure on load, wherein the wireless communications network is configured to control the use of EPDCCH resources by performing a process that includes not using any EPDCCH resource to transmit control information to an EPDCCH capable user terminal while the measure on load is below the first threshold;

detect whether there are no EPDCCH resources or other resources are assigned in certain orthogonal frequency division multiplexing (OFDM) symbols; and cause one or more power amplifiers of a base station to enter a low power or no power mode during the certain OFDM symbols as a result of detecting that no EPDCCH resources or other resources are assigned in the certain OFDM symbols.

10. The wireless communications network node as claimed in claim 9, wherein the process further includes assigning EPDCCH resources in the cell as a result of determining that the established measure on load is above the first threshold.

11. The wireless communications network node as claimed in claim 9, wherein the process further includes ceasing to assign EPDCCH resources in the cell as a result of determining that the established measure on load is below the first threshold.

12. The wireless communications network node as claimed in claim 9, wherein the process further includes:

assigning EPDCCH resources to a user equipment (UE);

after assigning EPDCCH resources to the UE, determining that the measure on load is below the first threshold; and in response to determining that the measure on load is below the first threshold, removing from the UE said EPDCCH resources that were assigned to the UE.

13. The wireless communications network node as claimed in claim 9, wherein the process further includes:

setting a state in a cell of the wireless communications network to EPDCCH disabled based on the established measure on load;

determining that the state in the cell is set to EPDCCH disabled; and not assigning EPDCCH resources as a result of determining that the state in the cell is set to EPDCCH disabled.

14. The wireless communications network node as claimed in claim 9, configured to establish the measure on the load by establishing, for the cell of the wireless communications network, utilization of downlink physical resource blocks, average number of scheduling entities per transmission time interval, utilization of control channel elements of a physical downlink control channel or peak number of uplink grants per frame.

15. The wireless communications network as claimed in claim 9, wherein the process further includes not assigning any new user equipments (UEs) entering the cell to monitor any EPDCCH resources while the measure on load is below the first threshold.

16. The method of claim 1, wherein the controlling the use of EPDCCH resources further comprises:

determining that the measure on load is below the first threshold; and in response to determining that the measure on load is below the first threshold, not assigning any new user equipments (UEs) entering the cell to monitor any EPDCCH resources while the measure on load is below the first threshold.

* * * * *

UNITED STATES PATENT AND TRADEMARK OFFICE
CERTIFICATE OF CORRECTION

| | |
|---|---|
| PATENT NO. | : 11,115,844 B2 |
| APPLICATION NO. | : 15/574704 |
| DATED | : September 7, 2021 |
| INVENTOR(S) | : Anders Johansson |

It is certified that error appears in the above-identified patent and that said Letters Patent is hereby corrected as shown below:

In the Specification

In Column 1, Line 32, delete "access" and insert -- Access --, therefor.

In Column 1, Line 44, delete "(OPEX)," and insert -- (OPEXs), --, therefor.

In Column 3, Lines 25-26, delete "cell-specific reference symbols (CRS)" and insert -- cell-specific reference signals ( (CRSs) --, therefor.

In Column 8, Lines 1-2, delete "or be removed their EPDCCH resources." and insert -- or their EPDCCH resources be removed. --, therefor.

In the Claims

In Column 14, Line 41, in Claim 15, delete "network" and insert -- network node --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*